(12) United States Patent
McKean et al.

(10) Patent No.: US 10,579,540 B2
(45) Date of Patent: Mar. 3, 2020

(54) RAID DATA MIGRATION THROUGH STRIPE SWAPPING

(71) Applicant: NetApp, Inc., Sunnyvale, CA (US)

(72) Inventors: Brian D. McKean, Boulder, CO (US);
Arindam Banerjee, Boulder, CO (US);
Kevin Kidney, Boulder, CO (US)

(73) Assignee: NETAPP, INC., Sunnyvale, CA (US)

( * ) Notice: Subject to any disclaimer, the term of this patent is extended or adjusted under 35 U.S.C. 154(b) by 86 days.

(21) Appl. No.: 15/010,160

(22) Filed: Jan. 29, 2016

(65) Prior Publication Data

US 2017/0220481 A1    Aug. 3, 2017

(51) Int. Cl.
*G06F 12/1009*    (2016.01)
*G06F 3/06*    (2006.01)

(52) U.S. Cl.
CPC ........ *G06F 12/1009* (2013.01); *G06F 3/0611* (2013.01); *G06F 3/0647* (2013.01); *G06F 3/0653* (2013.01); *G06F 3/0689* (2013.01)

(58) Field of Classification Search
CPC .. G06F 12/1009; G06F 3/0611; G06F 3/0647; G06F 3/0653; G06F 3/0689; G06F 2212/1024; G06F 2212/21; G06F 12/0246; G06F 3/0616; G06F 3/0617; G06F 3/0644; G06F 3/0665; G06F 3/0685; G06F 2212/1036; G06F 2212/152; G06F 2212/217; G06F 2212/262; G06F 2212/651; G06F 2212/657; G06F 2212/7201
See application file for complete search history.

(56) References Cited

U.S. PATENT DOCUMENTS

| | | | | |
|---|---|---|---|---|
| 5,696,934 A | * | 12/1997 | Jacobson | G06F 3/0601 711/E12.014 |
| 6,327,638 B1 | * | 12/2001 | Kirby | G06F 3/0608 711/4 |
| 6,675,274 B1 | * | 1/2004 | Lam | G06F 3/0613 711/170 |
| 8,489,844 B2 | * | 7/2013 | Orikasa | G06F 3/0608 710/18 |
| 8,706,960 B1 | * | 4/2014 | Ives | G06F 3/0617 711/114 |
| 8,725,986 B1 | * | 5/2014 | Goel | G06F 12/0223 711/114 |

(Continued)

*Primary Examiner* — Mano Padmanabhan
*Assistant Examiner* — Andrew J Cheong
(74) *Attorney, Agent, or Firm* — Haynes and Boone, LLP

(57) ABSTRACT

A system and method for improving storage system operation is disclosed. A storage system includes a first tier with high-performance redundancy and a second tier with capacity efficient redundancy. The first tier and the second tier are built from the same storage devices in a storage pool so each storage device includes both the first and second tiers. The storage system stores write data initially to the first tier. When demand for the data falls below a threshold, the storage system migrates the write data to the second tier. This is done by changing the mapping of underlying physical locations on the storage devices where the write data is stored so that the underlying physical locations are logically associated with the second tier instead of the first tier. After remapping, the storage system also computes parity information for the migrated write data and stores it in the second tier.

19 Claims, 8 Drawing Sheets

(56) References Cited

U.S. PATENT DOCUMENTS

| | | | |
|---|---|---|---|
| 2005/0223156 A1* | 10/2005 | Lubbers | G06F 3/0619 |
| | | | 711/100 |
| 2008/0109601 A1* | 5/2008 | Klemm | G06F 3/0608 |
| | | | 711/114 |
| 2010/0005228 A1* | 1/2010 | Fukutomi | G06F 11/108 |
| | | | 711/103 |
| 2011/0185120 A1* | 7/2011 | Jess | G06F 3/061 |
| | | | 711/114 |
| 2013/0124798 A1* | 5/2013 | Aszmann | G06F 3/0689 |
| | | | 711/114 |
| 2013/0151774 A1* | 6/2013 | Bolik | G06F 3/0604 |
| | | | 711/118 |
| 2014/0189211 A1* | 7/2014 | George | G06F 3/0613 |
| | | | 711/103 |
| 2014/0325121 A1* | 10/2014 | Akutsu | G06F 3/0604 |
| | | | 711/103 |
| 2014/0359347 A1* | 12/2014 | Fuxa | G06F 11/1096 |
| | | | 714/6.22 |
| 2015/0149719 A1* | 5/2015 | Shuster | G06F 3/0607 |
| | | | 711/114 |

* cited by examiner

RAID DATA MIGRATION THROUGH STRIPE SWAPPING

TECHNICAL FIELD

The present description relates to data storage systems, and more specifically, to a technique for the migration, with low overhead, of data between two different storage tiers of different performance and redundancy levels/types.

BACKGROUND

A storage volume is a grouping of data of any arbitrary size that is presented to a user as a single, unitary storage area regardless of the number of storage devices the volume actually spans. Typically, a storage volume utilizes some form of data redundancy, such as by being provisioned from a redundant array of independent disks (RAID) or a disk pool (organized by a RAID type). Some storage systems utilize multiple storage volumes, for example of the same or different data redundancy levels. Different storage volumes may have different data redundancy levels to take advantage of the different performance levels at a variety of workloads.

For example, some storage systems may have a first level with one or more storage volumes that have a first redundancy level. This first redundancy level may be a RAID level, such as 0, 1, or 10 as some examples, that provides a faster response time for small input/output (I/O). The storage systems may have a second level with one or more storage volumes that have a second redundancy level. The second redundancy level may be a RAID level, such as 5 or 6, that provides better capacity utilization (e.g., over RAID 1 or 10) and/or better device failure tolerance. In such tiered systems (those with at least two different storage volumes having different redundancy levels), the first, faster tier may have less capacity in comparison to the second, slower tier which provides better capacity utilization.

As a result, data stored in the first tier may occasionally be moved to the second tier to make room in the first tier for data that is more in demand. This is a relatively inefficient operation, however. It normally involves a storage controller of the storage system first copying the data from the first tier into the cache, and then writing the data again to the second tier. This frees up space in the first tier where the data was previously stored, but comes at the cost of many additional storage device (e.g., read and write) operations. This imposes a burden on the number of operations the controller performs, as well as potentially prematurely exhausts the life span of media that are designed to endure a limited number of writes.

BRIEF DESCRIPTION OF THE DRAWINGS

The present disclosure is best understood from the following detailed description when read with the accompanying figures.

DETAILED DESCRIPTION

Figure 1:
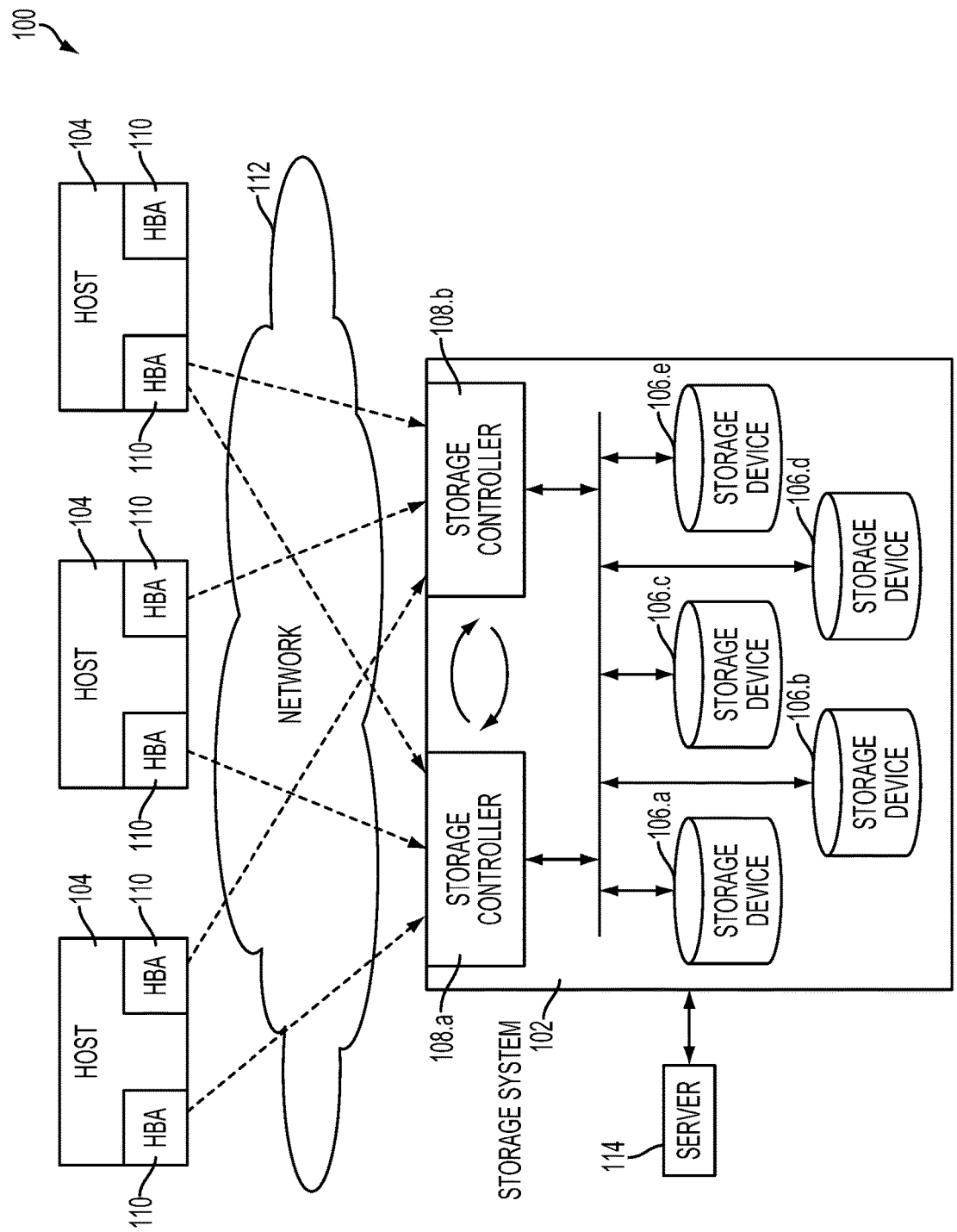
FIG. 1 is an organizational diagram of an exemplary data storage architecture according to aspects of the present disclosure.

All examples and illustrative references are non-limiting and should not be used to limit the claims to specific implementations and embodiments described herein and their equivalents. For simplicity, reference numbers may be repeated between various examples. This repetition is for clarity only and does not dictate a relationship between the respective embodiments. Finally, in view of this disclosure, particular features described in relation to one aspect or embodiment may be applied to other disclosed aspects or embodiments of the disclosure, even though not specifically shown in the drawings or described in the text.

Various embodiments include systems, methods, and machine-readable media for improving the operation of storage systems by reducing the number of operations that are performed for data migration between different redundancy levels. In an exemplary embodiment, a multi-tier system includes a first tier having a volume with a redundancy type suitable for high performance and a second tier having a volume with a redundancy type suitable for capacity efficiency. For example, the first tier volume type may be a RAID 10 and the second tier volume type may be a RAID 5 or RAID 6. The first tier volume and the second tier volume may be built from the same set of storage devices in a storage pool, such that each storage device involved includes both the first and second tier volumes.

When data is sent to the storage system for storage, referred to herein as write data, the storage system stores the write data initially to the first tier volume to facilitate high performance access to the write data. When demand for the write data declines, for example by falling below a threshold, the storage system may migrate the write data to the second tier volume for capacity efficiency. To perform the migration, the storage system may directly swap data extents from the first tier volume to the second tier volume with unused data extents from the second tier volume to the first tier volume. In other words, the storage system changes the mapping of underlying physical locations on the storage devices where the write data is stored so that the underlying physical locations are logically associated with the second tier volume instead of the first tier volume. After remapping, the storage system also computes parity information for the migrated write data and stores it in the second tier volume.

As a result of this swapping/remapping, the storage system's performance is improved by reducing the number of operations necessary to migrate the write data. Further, the overall number of blocks written to storage devices is reduced, reducing wear on the storage devices themselves which may have limited endurance.

FIG. 1 illustrates a data storage architecture 100 in which various embodiments may be implemented. The storage architecture 100 includes a storage system 102 in communication with a number of hosts 104. The storage system 102 is a system that processes data transactions on behalf of other computing systems including one or more hosts, exemplified by the hosts 104. The storage system 102 may receive data transactions (e.g., requests to write and/or read data) from one or more of the hosts 104, and take an action such as reading, writing, or otherwise accessing the requested data. For many exemplary transactions, the storage system 102 returns a response such as requested data and/or a status indictor to the requesting host 104. It is understood that for clarity and ease of explanation, only a single storage system 102 is illustrated, although any number of hosts 104 may be in communication with any number of storage systems 102.

While the storage system 102 and each of the hosts 104 are referred to as singular entities, a storage system 102 or host 104 may include any number of computing devices and may range from a single computing system to a system cluster of any size. Accordingly, each storage system 102 and host 104 includes at least one computing system, which in turn includes a processor such as a microcontroller or a central processing unit (CPU) operable to perform various computing instructions. The instructions may, when executed by the processor, cause the processor to perform various operations described herein with the storage controllers 108.a, 108.b in the storage system 102 in connection with embodiments of the present disclosure. Instructions may also be referred to as code. The terms "instructions" and "code" may include any type of computer-readable statement(s). For example, the terms "instructions" and "code" may refer to one or more programs, routines, sub-routines, functions, procedures, etc. "Instructions" and "code" may include a single computer-readable statement or many computer-readable statements.

The processor may be, for example, a microprocessor, a microprocessor core, a microcontroller, an application-specific integrated circuit (ASIC), etc. The computing system may also include a memory device such as random access memory (RAM); a non-transitory computer-readable storage medium such as a magnetic hard disk drive (HDD), a solid-state drive (SSD), or an optical memory (e.g., CD-ROM, DVD, BD); a video controller such as a graphics processing unit (GPU); a network interface such as an Ethernet interface, a wireless interface (e.g., IEEE 802.11 or other suitable standard), or any other suitable wired or wireless communication interface; and/or a user I/O interface coupled to one or more user I/O devices such as a keyboard, mouse, pointing device, or touchscreen.

With respect to the storage system 102, the exemplary storage system 102 contains any number of storage devices 106 and responds to one or more hosts 104's data transactions so that the storage devices 106 may appear to be directly connected (local) to the hosts 104. In various examples, the storage devices 106 include hard disk drives (HDDs), solid state drives (SSDs), optical drives, and/or any other suitable volatile or non-volatile data storage medium. In some embodiments, the storage devices 106 are relatively homogeneous (e.g., having the same manufacturer, model, and/or configuration). However, the storage system 102 may alternatively include a heterogeneous set of storage devices 106 that includes storage devices of different media types from different manufacturers with notably different performance.

The storage system 102 may group the storage devices 106 for speed and/or redundancy using a virtualization technique such as RAID or disk pooling (that may utilize a RAID level). The storage system 102 also includes one or more storage controllers 108.a, 108.b in communication with the storage devices 106 and any respective caches. The storage controllers 108.a, 108.b exercise low-level control over the storage devices 106 in order to execute (perform) data transactions on behalf of one or more of the hosts 104. The storage controllers 108.a, 108.b are illustrative only; more or fewer may be used in various embodiments. Having at least two storage controllers 108.a, 108.b may be useful, for example, for failover purposes in the event of equipment failure of either one. The storage system 102 may also be communicatively coupled to a user display for displaying diagnostic information, application output, and/or other suitable data.

In an embodiment, the storage system 102 may group the storage devices 106 using a dynamic disk pool (DDP) (or other declustered parity) virtualization technique. In a dynamic disk pool, volume data, protection information, and spare capacity are distributed across all of the storage devices included in the pool. As a result, all of the storage devices in the dynamic disk pool remain active, and spare capacity on any given storage device is available to all volumes existing in the dynamic disk pool. Each storage device in the disk pool is logically divided up into one or more data extents at various logical block addresses (LBAs) of the storage device. A data extent is assigned to a particular data stripe of a volume. An assigned data extent becomes a "data piece," and each data stripe has a plurality of data pieces, for example sufficient for a desired amount of storage capacity for the volume and a desired amount of redundancy, e.g. RAID 0, RAID 1, RAID 10, RAID 5 or RAID 6 (to name some examples). As a result, each data stripe appears as a mini RAID volume, and each logical volume in the disk pool is typically composed of multiple data stripes.

In the present example, storage controllers 108.a and 108.b are arranged as an HA pair. Thus, when storage controller 108.a performs a write operation for a host 104, storage controller 108.a may also send a mirroring I/O operation to storage controller 108.b. Similarly, when storage controller 108.b performs a write operation, it may also send a mirroring I/O request to storage controller 108.a. Each of the storage controllers 108.a and 108.b has at least one processor executing logic to perform writing and migration techniques according to embodiments of the present disclosure.

Moreover, the storage system 102 is communicatively coupled to server 114. The server 114 includes at least one computing system, which in turn includes a processor, for example as discussed above. The computing system may also include a memory device such as one or more of those discussed above, a video controller, a network interface, and/or a user I/O interface coupled to one or more user I/O devices. The server 114 may include a general purpose computer or a special purpose computer and may be embodied, for instance, as a commodity server running a storage operating system. While the server 114 is referred to as a singular entity, the server 114 may include any number of computing devices and may range from a single computing system to a system cluster of any size. In an embodiment, the server 114 may also provide data transactions to the storage system 102. Further, the server 114 may be used to configure various aspects of the storage system 102, for example under the direction and input of a user. Some configuration aspects may include definition of RAID group(s), disk pool(s), and volume(s), to name just a few examples.

With respect to the hosts 104, a host 104 includes any computing resource that is operable to exchange data with a storage system 102 by providing (initiating) data transactions to the storage system 102. In an exemplary embodiment, a host 104 includes a host bus adapter (HBA) 110 in communication with a storage controller 108.a, 108.b of the storage system 102. The HBA 110 provides an interface for communicating with the storage controller 108.a, 108.b, and in that regard, may conform to any suitable hardware and/or software protocol. In various embodiments, the HBAs 110 include Serial Attached SCSI (SAS), iSCSI, InfiniBand, Fibre Channel, and/or Fibre Channel over Ethernet (FCoE) bus adapters. Other suitable protocols include SATA, eSATA, PATA, USB, and FireWire.

The HBAs 110 of the hosts 104 may be coupled to the storage system 102 by a network 112, for example a direct connection (e.g., a single wire or other point-to-point connection), a networked connection, or any combination thereof. Examples of suitable network architectures 112 include a Local Area Network (LAN), an Ethernet subnet, a PCI or PCIe subnet, a switched PCIe subnet, a Wide Area Network (WAN), a Metropolitan Area Network (MAN), the Internet, Fibre Channel, or the like. In many embodiments, a host 104 may have multiple communicative links with a single storage system 102 for redundancy. The multiple links may be provided by a single HBA 110 or multiple HBAs 110 within the hosts 104. In some embodiments, the multiple links operate in parallel to increase bandwidth.

To interact with (e.g., write, read, modify, etc.) remote data, a host HBA 110 sends one or more data transactions to the storage system 102. Data transactions are requests to write, read, or otherwise access data stored within a data storage device such as the storage system 102, and may contain fields that encode a command, data (e.g., information read or written by an application), metadata (e.g., information used by a storage system to store, retrieve, or otherwise manipulate the data such as a physical address, a logical address, a current location, data attributes, etc.), and/or any other relevant information. The storage system 102 executes the data transactions on behalf of the hosts 104 by writing, reading, or otherwise accessing data on the relevant storage devices 106. A storage system 102 may also execute data transactions based on applications running on the storage system 102 using the storage devices 106. For some data transactions, the storage system 102 formulates a response that may include requested data, status indicators, error messages, and/or other suitable data and provides the response to the provider of the transaction.

Data transactions are often categorized as either block-level or file-level. Block-level protocols designate data locations using an address within the aggregate of storage devices 106. Suitable addresses include physical addresses, which specify an exact location on a storage device, and virtual addresses, which remap the physical addresses so that a program can access an address space without concern for how it is distributed among underlying storage devices 106 of the aggregate. Exemplary block-level protocols include iSCSI, Fibre Channel, and Fibre Channel over Ethernet (FCoE). iSCSI is particularly well suited for embodiments where data transactions are received over a network that includes the Internet, a WAN, and/or a LAN. Fibre Channel and FCoE are well suited for embodiments where hosts 104 are coupled to the storage system 102 via a direct connection or via Fibre Channel switches. A Storage Attached Network (SAN) device is a type of storage system 102 that responds to block-level transactions.

In contrast to block-level protocols, file-level protocols specify data locations by a file name. A file name is an identifier within a file system that can be used to uniquely identify corresponding memory addresses. File-level protocols rely on the storage system 102 to translate the file name into respective memory addresses. Exemplary file-level protocols include SMB/CFIS, SAMBA, and NFS. A Network Attached Storage (NAS) device is a type of storage system that responds to file-level transactions. It is understood that the scope of present disclosure is not limited to either block-level or file-level protocols, and in many embodiments, the storage system 102 is responsive to a number of different memory transaction protocols.

According to embodiments of the present disclosure, the storage system 102 may include multiple storage tiers, with each tier having a different redundancy level. This is illustrated, in one example, in FIG. 2, which is an organizational diagram of an exemplary controller architecture for a storage system 102 according to aspects of the present disclosure. Additionally, and as explained in more detail below, various embodiments include the storage controllers 108.a and 108.b executing computer readable code to perform the stripe swapping operations described herein.

Figure 2:
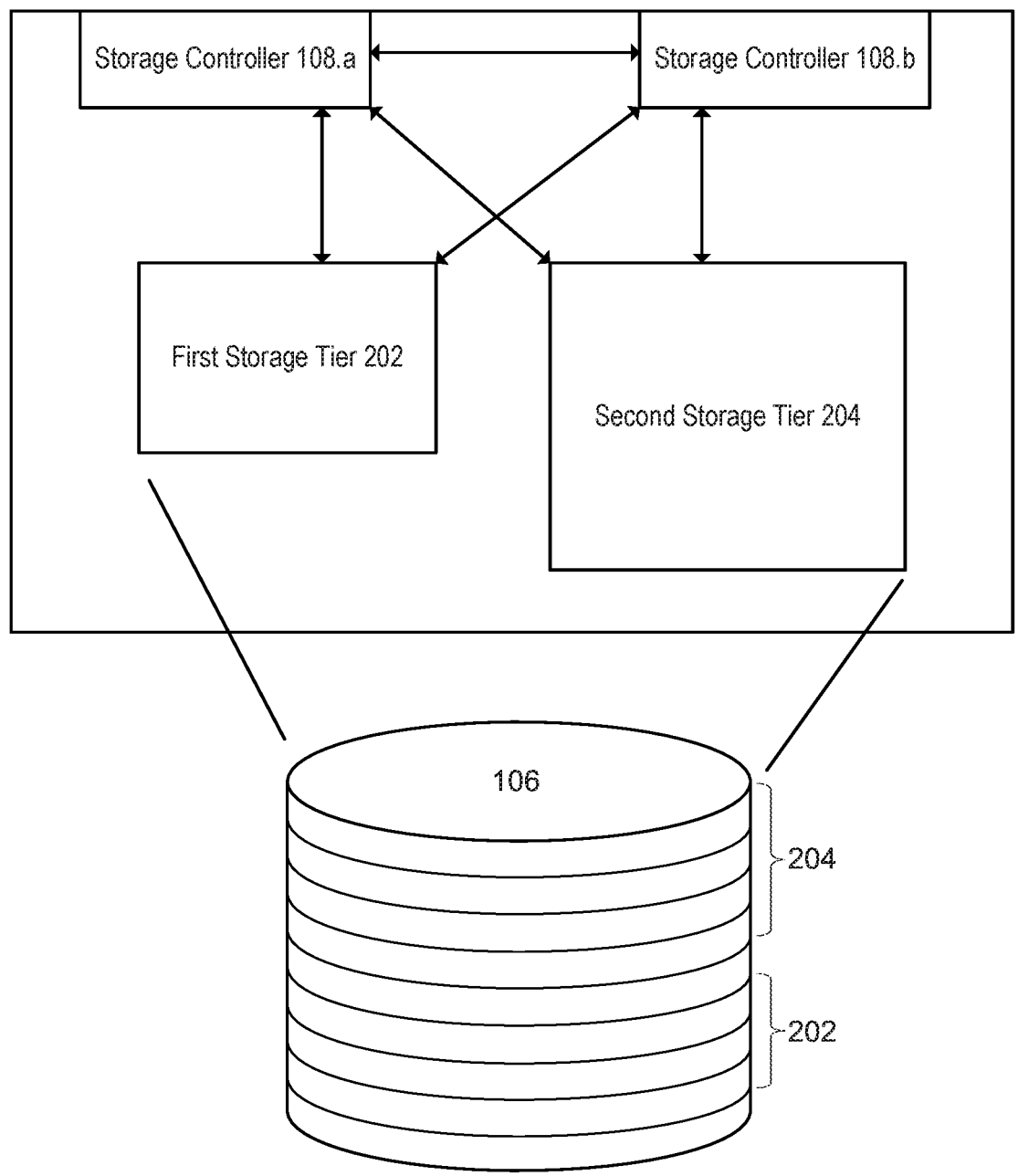
FIG. 2 is an organizational diagram of an exemplary controller architecture according to aspects of the present disclosure.

FIG. 2 illustrates a first storage tier 202 and a second storage tier 204. Embodiments of the present disclosure may include more than two tiers as well without departing from the scope of the present disclosure. The first storage tier 202 and the second storage tier 204 may each be in communication with both of the redundant storage controllers 108.a, 108.b. The first storage tier 202 may be implemented with a RAID level (or other type of organization that may implement features similar to RAID levels) that provides relatively better performance as compared with other RAID levels. For example, the first storage tier 202 may be implemented with a RAID 0, RAID 1, or RAID 10 level. For purposes of discussion here, the first storage tier 202 will be described as being implemented as a dynamic disk pool implementing a redundancy similar to RAID 10 (e.g., a fast RAID level that includes redundancy). The first storage tier 202 may include one or more volumes, for example volumes that logically may span one or more physical storage devices 106.

The second storage tier 204 may be implemented with a RAID level (or other type of organization that may implement features similar to RAID levels) that provides relatively better capacity utilization (usually at the expense of speed performance) as compared with the RAID level type implemented for the first storage tier 202. For example, the second storage tier 204 may be implemented with a RAID 5 or RAID 6 level. For purposes of discussion here, the second storage tier 204 will be described as being implemented as a DDP implementing a redundancy similar to RAID 5. The second storage tier 204 may also include one or more volumes, for example logical volumes that logically may span one or more physical storage devices 106.

An exemplary physical storage device 106 with multiple data extents is illustrated in FIG. 2 as well. According to embodiments of the present disclosure, a given storage device 106 may be logically partitioned into multiple volumes. Thus, in FIG. 2 a first portion of the physical storage device 106 may be associated with a first volume of the first storage tier 202 and a second portion with a second volume of the second storage tier 204. A single physical storage device 106 is illustrated for ease of demonstration in FIG. 2. A typical implementation may incorporate any number of these physical storage devices 106, for example according to DDP/RAID techniques a different data extent of a given data stripe in a storage tier may be stored in each of multiple physical storage devices 106. Also, the following examples in FIGS. 2-4D are given with respect to one storage controller (108.a or 108.b) performing the actions, where the example refers to storage controller 108. However, it is understood that the other one of the storage controllers 108.*a* or 108.*b* has the same capabilities and may perform the same operations when it executes a read or write operation. For example, each storage controller may maintain its own mapping tables and may perform its own read and write operations received from various ones of the hosts.

According to embodiments of the present disclosure, when a host 104 sends write data to the storage system 102, a storage controller 108 receives the write request/data and writes the data to a data stripe of the first storage tier 202, so that better write performance may be obtained. The write data may then be maintained at the first storage tier 202 for a period of time that the write data is frequently accessed, e.g. has an access frequency above a first threshold (such as a number of accesses during a fixed period of time). When the frequency of access falls, and/or after a specified period of time expires, the storage controller 108 may migrate the write data from the first storage tier 202 to the second storage tier 204, so that the data may be stored for a longer term in a volume more suitable to long term storage.

For the migration, the storage controller 108 looks to what data extents of the second storage tier 204 are available from the same physical storage devices 106 where the data extents of the first storage tier 202 already are associated with the write data. For example, the write data may be stored on first, second, third, and fourth data extents associated with first, second, third, and fourth physical storage devices 106 for the first storage tier 202. As a result, the storage controller 108 may look to determine which data extents associated with (also referred to as being mapped to) the second storage tier 204 on the same physical storage devices 106 are available for swapping the data stripe containing the write data.

Once the storage controller 108 has identified available data extents mapped to the same physical storage devices 106 for the second storage tier 204, the storage controller 108 may update the mapping information in mapping tables maintained for each of the first storage tier 202 and the second storage tier 204. For the update, the storage controller 108 associates the data extents currently mapped to the locations on the corresponding physical storage devices 106 storing the write data to the second storage tier 204 (to locations on the same physical storage devices 106 that are "empty"—whether truly empty or available to have their existing data overwritten). The storage controller 108 further associates the data extents currently mapped to the "empty" locations to the first storage tier 202, specifically to the locations on the corresponding physical storage devices 106 storing the write data.

As a result of the mapping change for the data stripe containing the write data, the storage controller 108 of the storage system 102 may migrate the write data to the second storage tier 204 from the first storage tier 202 without having to further move the write data itself. The above-noted aspects of the present disclosure do not require the storage controller 108 to read out the write data from the first storage tier 202 into cache and re-write it to the second storage tier 204. Rather, the write data remains in the same physical locations on the physical storage devices 106, while the logical mappings change to reflect the desired storage tier.

Figure 3:
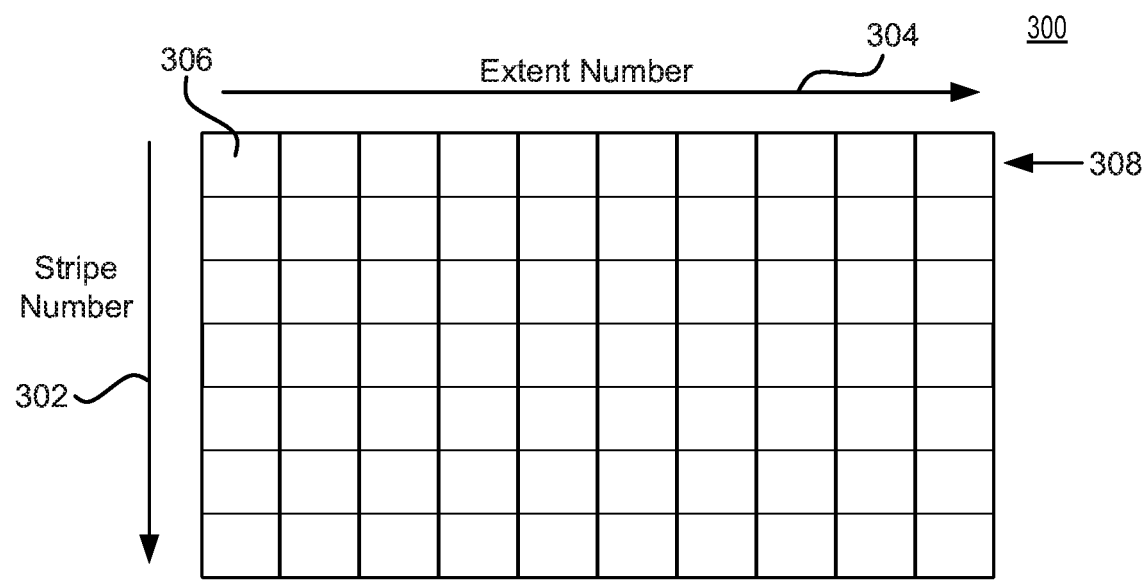
FIG. 3 is a diagram illustrating an exemplary mapping table according to aspects of the present disclosure.

FIG. 3 is a diagram illustrating an exemplary mapping table 300 according to aspects of the present disclosure. As noted above, the mapping table 300 may be a table maintained by a storage controller 108 of the storage system 102. It may be kept in a cache of the storage controller 108 and/or longer-term storage. There may be a single mapping table that the storage controller 108 maintains for multiple storage tiers. Alternatively, each storage tier may have its own mapping table that is maintained by the storage controller 108. For example, the storage controller 108 may maintain a first mapping table 300 for tracking the first storage tier 202 of FIG. 2 and a second mapping table 300 for tracking the second storage tier 204.

As illustrated, the mapping table 300 is a two-dimensional table where each row corresponds to a different data stripe (or multiple data stripes) 308. A data stripe 308 may have a plurality of data pieces, for example sufficient for a desired amount of storage capacity for the volume and a desired amount of redundancy. As illustrated, the rows go in order of stripe number 302, e.g. in increasing order of value. As further illustrated, the columns correspond to different data extents 306 and go in order of extent number 304. Each storage device may be logically divided up into one or more data extents at various logical block addresses (LBAs) of the storage device. For example, that may be in order of increasing value (e.g., 1, 2, 3, . . . ). With this combination (stripe number and extent number), the storage controller 108 is able to locate information at a specified LBA found in a given stripe/data extent combination.

When the storage controller 108 is performing a data migration according to embodiments of the present disclosure, the storage controller 108 may access the mapping table 300 for the first storage tier 202, locate the entries in the table corresponding to the write data to be migrated, and remove those entries from the table. The storage controller 108 may at approximately the same time (or subsequently) access the mapping table 300 for the second storage tier 204 and locate entries in the table corresponding to available data extents of the second storage tier 204 and remove those entries from the second table.

The storage controller 108 places the entries corresponding to the write data into the mapping table 300 for the second storage tier 204 in place of the entries that used to correspond to available data extents. Similarly, the storage controller 108 places the entries corresponding to the available data extents into the mapping table for the first storage tier 202 in place of the entries that previously corresponding to the write data that has now been migrated. As a result, the pointers in the tables corresponding to the first and second storage tiers 202, 204 now point to different physical locations for the migrated data stripes, while the write data itself did not have to be re-written for the migration to occur.

An example of how embodiments of the present disclosure operate to migrate data between storage tiers while reducing the number of disk operations necessary to migrate the data (and, thereby, increase system performance) is now discussed with respect to the storage device arrangement 400 illustrated in FIGS. 4A, 4B, 4C, and 4D. The example storage device arrangement 400 illustrated in these figures is for ease of discussion only. In these figures, eight storage devices 106*a*, 106*b*, 106*c*, 106*d*, 106*e*, 106*f*, 106*g*, and 106*h* are illustrated. More or fewer may be included as will be recognized. As illustrated here, the storage tiers 202, 204 correspond to respective volumes (in other words, the volumes are co-extant with the storage tiers they are associated with, such that reference to the storage tier 202 is also reference to the volume having the first redundancy level and reference to the storage tier 204 is also reference to the volume having the second redundancy level) in this example.

In the example illustrated in FIGS. 4A, 4B, 4C, and 4D, the first storage tier 202 has implemented a DDP RAID 10 architecture, but is arranged with the data extents grouped together (across storage devices 106 for a given stripe)

followed by corresponding mirror drive extents. Other RAID types could alternatively be implemented that are faster than the RAID types that focus more on capacity utilization. The second storage tier 204 has implemented a DDP RAID 5 architecture, here a 4+1 (four data with one parity extent) architecture. In an embodiment, this may involve a de-cluster parity.

Figure 4A:
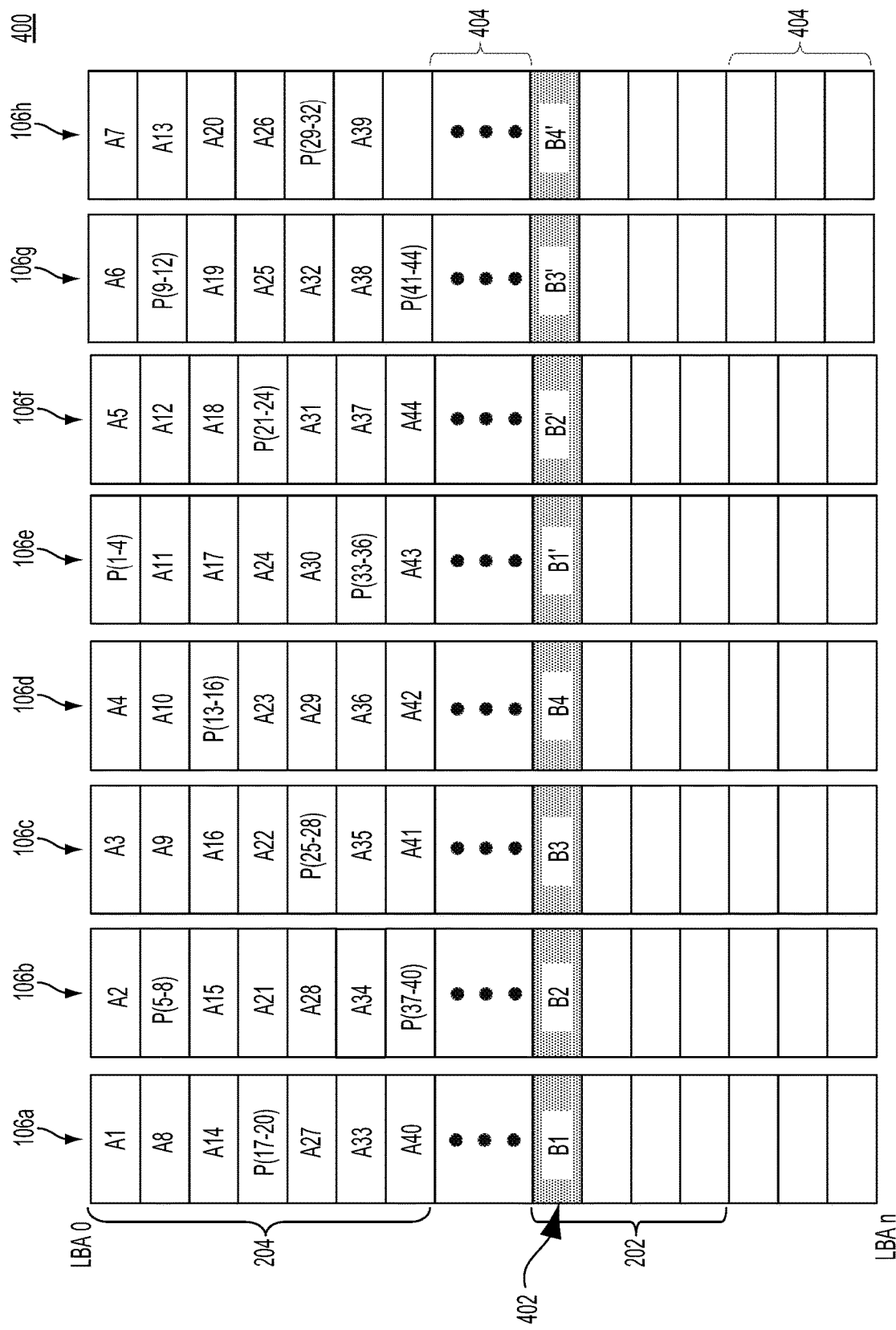
FIG. 4A is an organizational diagram of an exemplary data pool architecture according to aspects of the present disclosure.

As noted above, the first storage tier 202 is implemented on the same physical storage devices 106 as the second storage tier 204 so that data migration may occur without having to rewrite the data between tiers. FIG. 4A illustrates this with the second storage tier 204 occupying a first range of LBAs on the storage devices 106*a*, 106*b*, 106*c*, 106*d*, 106*e*, 106*f*, 106*g*, and 106*h*, the first storage tier 202 occupying a second range of LBAs on the storage devices 106*a*, 106*b*, 106*c*, 106*d*, 106*e*, 106*f*, 106*g*, and 106*h*, and a gap range of LBAs 404 between them as well as potentially after the first storage tier 202 on any given storage device (and/or potentially before the second storage tier 204). Although the second storage tier 204 is illustrated as occupying a lower LBA range than the first storage tier 202, the placement may be reversed such as the first storage tier occupies a lower LBA range than the second storage tier 204.

In FIG. 4A, data is not stored yet in the physical locations associated with the data extents A1 through A44 of the second storage tier 204. Write data 402 is received and goes to the first storage tier 202 (in this embodiment, the write data first goes towards the first storage tier 202 before later migration to the second, usually slower second storage tier 204). When the storage controller 108 receives the write data 402, it initially writes it to data extents B1, B2, B3 and B4 in the first storage tier 202 (illustrated with the box fill in FIG. 4A). Additionally, according to the RAID redundancy level of the first storage tier 202 in this example, the storage controller 108 also creates a mirror of the write data and writes it to data extents B1', B2', B3', and B4'.

In an embodiment, such as the one illustrated in FIGS. 4A, 4B, 4C, and 4D, the data extents of the write data and mirror data in the first storage tier 202 are contiguous to each other—or, in other words, data extents are not left unused between the write data at B1, B2, B3, and B4 and the mirror data B1', B2', B3', and B4'. As a result, the capacity of the first storage tier 202 may be better utilized. However, this leaves a mismatch between the first and second storage tiers 202, 204 for subsequent data stripes. For example, since the second storage tier 204 is implementing a 4+1 volume, the storage controller 108 may have to search multiple ranges of data extents in order to identify corresponding available data extents between the first and second storage tiers.

For example, in the FIG. 4A embodiment, data extents B1, B2, B3, and B4 are on the same storage devices 106*a*, 106*b*, 106*c*, and 106*d* as data extents A1, A2, A3, and A4 of the second storage tier 204. Thus, these are available candidates for stripe swapping during data migration. With the additional parity extent on storage device 106*e*, there arises a mismatch between the next stripe of write data stored to the first storage tier 202 (the mismatch being the availability of the same number of data extents of the second storage tier 204 on the same storage devices 106 as the data extents of the first storage tier 202 that may be migrating). Therefore, the storage controller 108 may skip certain sections of data extents of the second storage tier 204 until a suitable set of data extents are unused and available to be swapped as a stripe to the first storage tier 202 (which may be the data extents A33, A34, A35, and A36 in the example of FIG. 4A, leaving the intervening data extents potentially unused or filled with other data not yet migrated from the first storage tier 202).

In an alternative embodiment, one or more data extents of the first storage tier 202 may be left unused (e.g., a gap of one or more data extents between the write data B1-B4 and the mirror data B1'-B4'). This facilitates a direct mapping consistently between the different storage volumes on the same storage devices 106. This removes the potential for mismatch between the stripes of write data in the first storage tier 202 and the availability of unused data extents (stripes) in the second storage tier 204. This comes at the cost of potentially unused data extents in the first storage tier 202, which may already suffer from a reduced capacity capability depending upon the RAID type implemented.

Figure 4B:
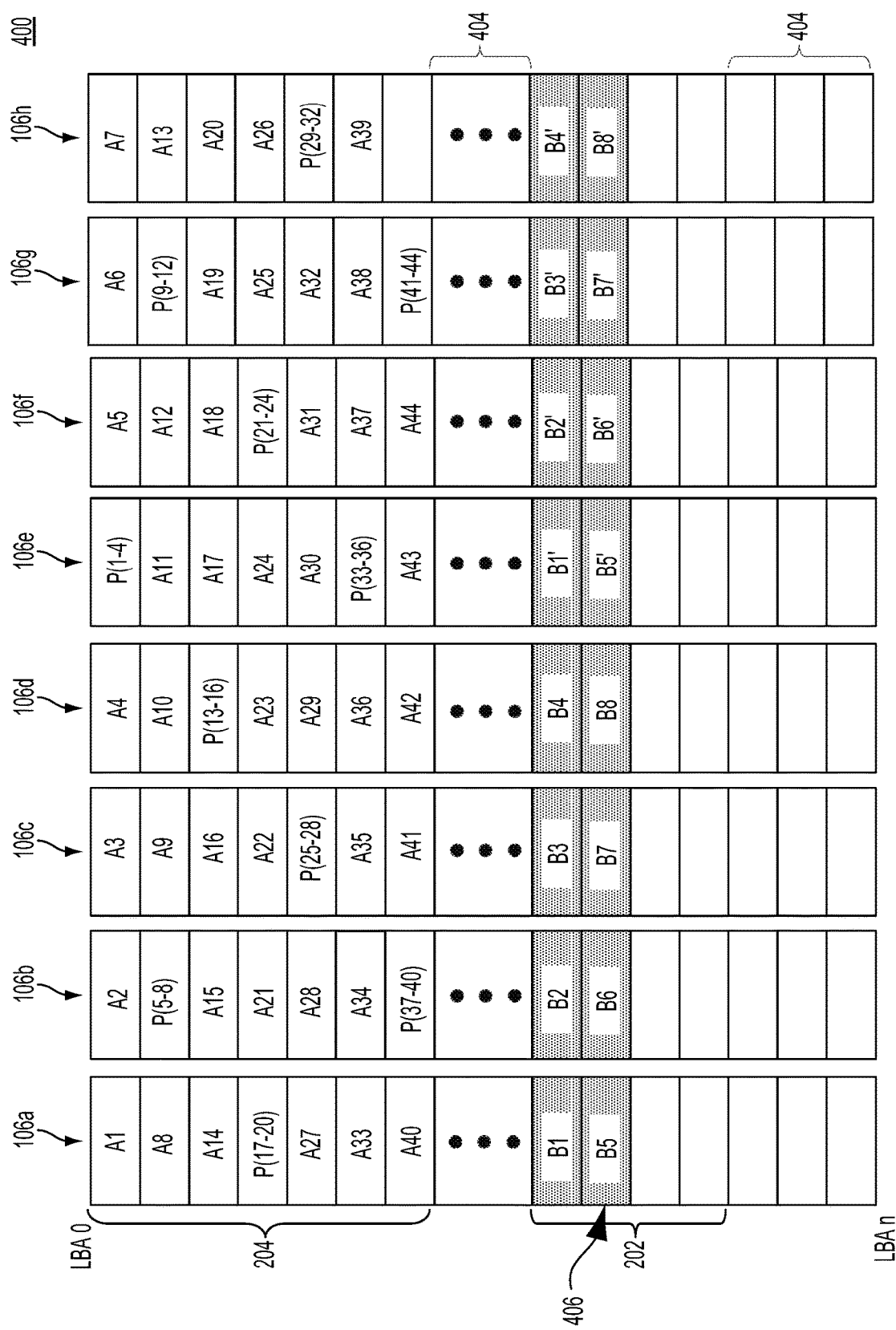
FIG. 4B is an organizational diagram of an exemplary data pool architecture according to aspects of the present disclosure.

Turning now to FIG. 4B, after some time (whether a short period or longer), the storage controller 108 receives write data 406 and initially writes it to data extents B5, B6, B7 and B8 in the first storage tier 202. Additionally, according to the RAID redundancy level of the first storage tier 202 in this example, the storage controller 108 also creates a mirror of the write data and writes it to data extents B5', B6', B7', and B8'. In FIG. 4B, according to the example, the write data 402 remains in the first storage tier 202 because it is frequently accessed, for example above a predetermined number of times (whether read or modify) over a predetermined period of time. Thus, no data migration between tiers occurs yet.

Figure 4C:
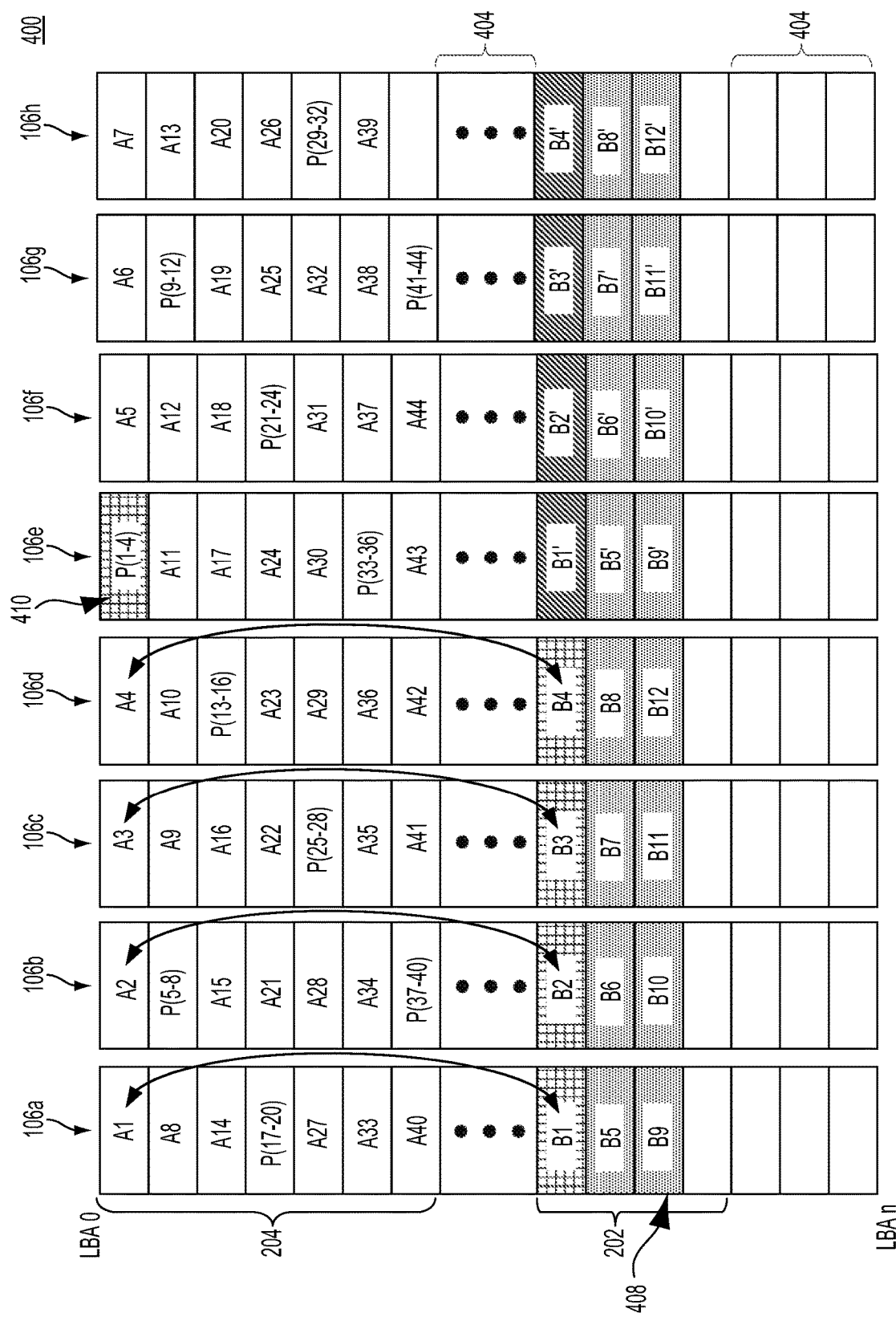
FIG. 4C is an organizational diagram of an exemplary data pool architecture according to aspects of the present disclosure.

Turning now to FIG. 4C, after some time from the events of FIG. 4B, the storage controller 108 receives write data 408 and initially writes it to data extents B9, B10, B11, and B12 in the first storage tier 202. Additionally, according to the RAID redundancy level of the first storage tier 202 in this example, the storage controller 108 also creates a mirror of the write data and writes it to data extents B9', B10', B11', and B12'. In conjunction with receipt of the write data 408, or separate from, the storage controller 108 may determine that the write data 402 stored at data extents B1, B2, B3, and B4 is no longer "hot," or accessed a number of times that exceeds the predetermined threshold.

As a result, the storage controller 108 may determine that the write data 402 should be migrated to the second storage tier 204. To that end, the storage controller 108 identifies data extents in the second storage tier 204 that are both unused and correspond to the same storage devices 106 where the data extents of the first storage tier 202 are located (here, of storage devices 106*a*, 106*b*, 106*c*, and 106*d* that correspond to where the data extents B1, B2, B3, and B4 are currently mapped). In the example of FIG. 4C, the storage controller 108 may identify the data extents A1, A2, A3, and A4 of the second storage tier 204 as unused and therefore available for the data stripe migration. Since a 4+1 RAID 5 type is being implemented in this example, the storage controller 108 may also confirm that a data extent is also available (e.g., unused) for storing parity information.

Once the storage controller 108 has identified, or located, data extents for the migration, the storage controller 108 may proceed with changing the mapping information for the data stripes. For example, the storage controller 108 may access a mapping table for the first storage tier 202, unmap the data extents/data stripe corresponding to the write data in the first storage tier 202's mapping table (e.g., the table 300 of FIG. 3), and remap the data extents/data stripe corresponding to the unused device 106 ranges from the second storage tier 204's mapping table to the first storage tier 202's mapping table. Similarly, the storage controller 108 may access a mapping table for the second storage tier 204, unmap the data extents/data stripe corresponding to the unused portions (e.g., in a corresponding table 300), and remap the data extents/data stripe corresponding to the write data to the second storage tier 204's mapping table. This remapping is illustrated in FIG. 4C with the bi-directional arrows for these data extents, indicating that they are swapped with each other in the first and second storage tiers 202, 204 without changing the data actually stored at the underlying physical locations.

After the mapping information in the respective mapping tables are changed/updated, the storage controller 108 may compute parity information 410 for the data extents B1, B2, B3, and B4 that are now mapped to the second storage tier 204. The parity information 410 is stored adjacent to the data extent A4 as parity extent P(1-4) associated with storage device 106e. Further, since the data extents B1, B2, B3, and B4 corresponding to the write data have been migrated as a data stripe to the second storage tier 204, the mirror data remaining in the first storage tier 202 becomes unnecessary (for example, after the parity information has been computed and stored). The data extents B1', B2', B3', and B4' may therefore be reclaimed (e.g., by the storage controller 108) and reused (together with the unused A1, A2, A3, and A4 data extents now mapped to the first storage tier 202) for future writes to the first storage tier 202.

Because the storage devices 106 have multiple volumes associated with the multiple storage tiers on each of them, and data is remapped to data extents of the other storage tier(s) on the same physical devices 106, the number of writes may be noticeably reduced. In the example of FIG. 4C, there are 4 reads (corresponding to the 4 data extents with write data) and one write (the parity information 410 stored after the remapping). In contrast, movement of the underlying data to a different location corresponding to the second storage tier 204 would have resulted in 4 reads and 5 writes (the four data extents with the write data plus the parity information).

Figure 4D:
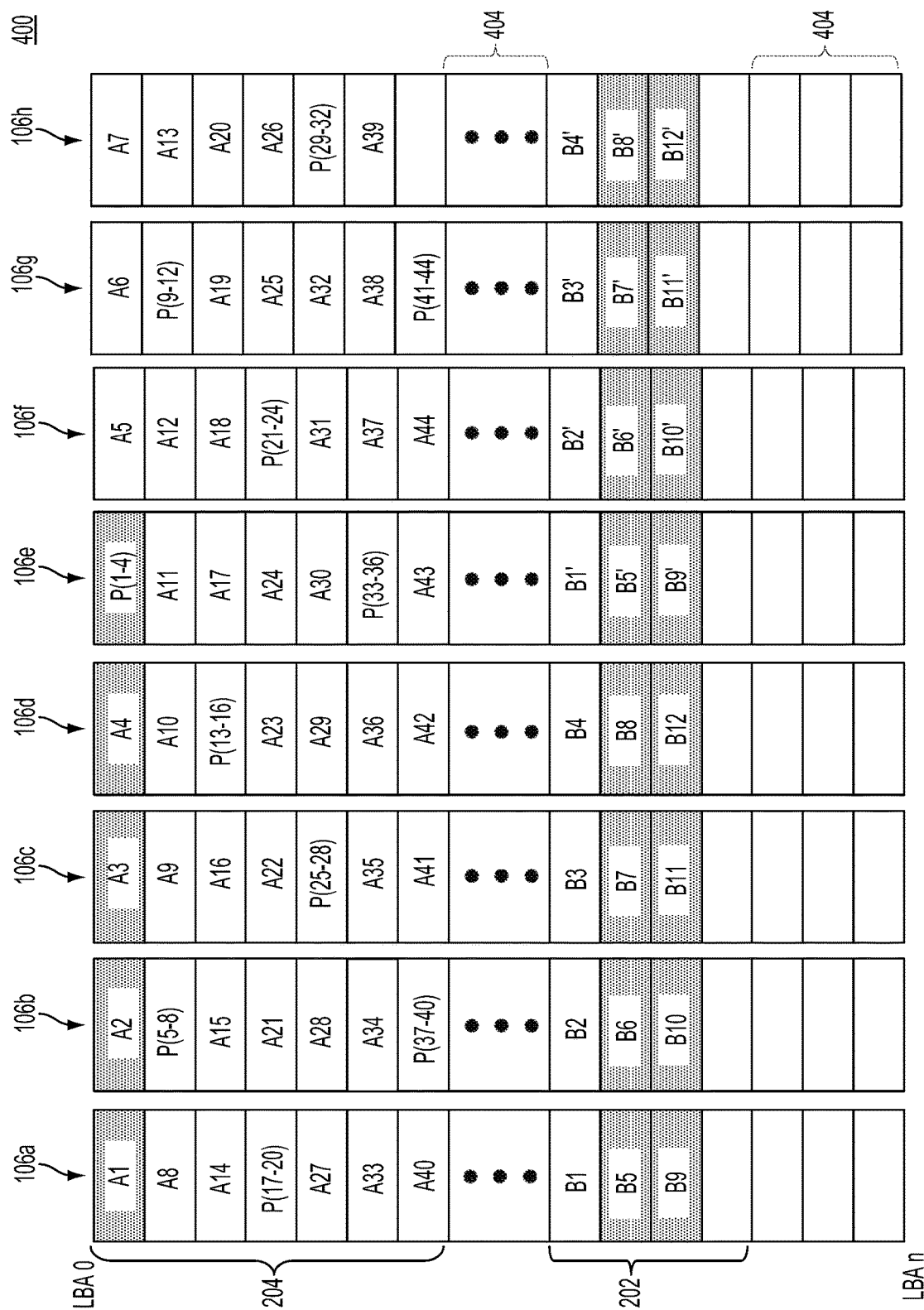
FIG. 4D is an organizational diagram of an exemplary data pool architecture according to aspects of the present disclosure.

The results of this migration may be seen in FIG. 4D. As illustrated in FIG. 4D, the write data migrated to the second storage tier 204 is now maintained at data extents A1, A2, A3, and A4 (with parity information at P(1-4)). Thus, these logical data extents are now occupied in the second storage tier 204. Further, data extents B1, B2, B3, B4, B1', B2', B3', and B4' are now unused in the first storage tier 202 and may be written to (for example, the storage controller 108 may cyclically work through the LBA ranges of the first storage tier 202 and eventually loop back to the now unused data extents). The storage controller 108 may continue initially storing incoming write data in the first storage tier 202 and then migrate the data according to embodiments of the present disclosure after some period of time has passed and/or access frequency threshold passed.

Figure 5:
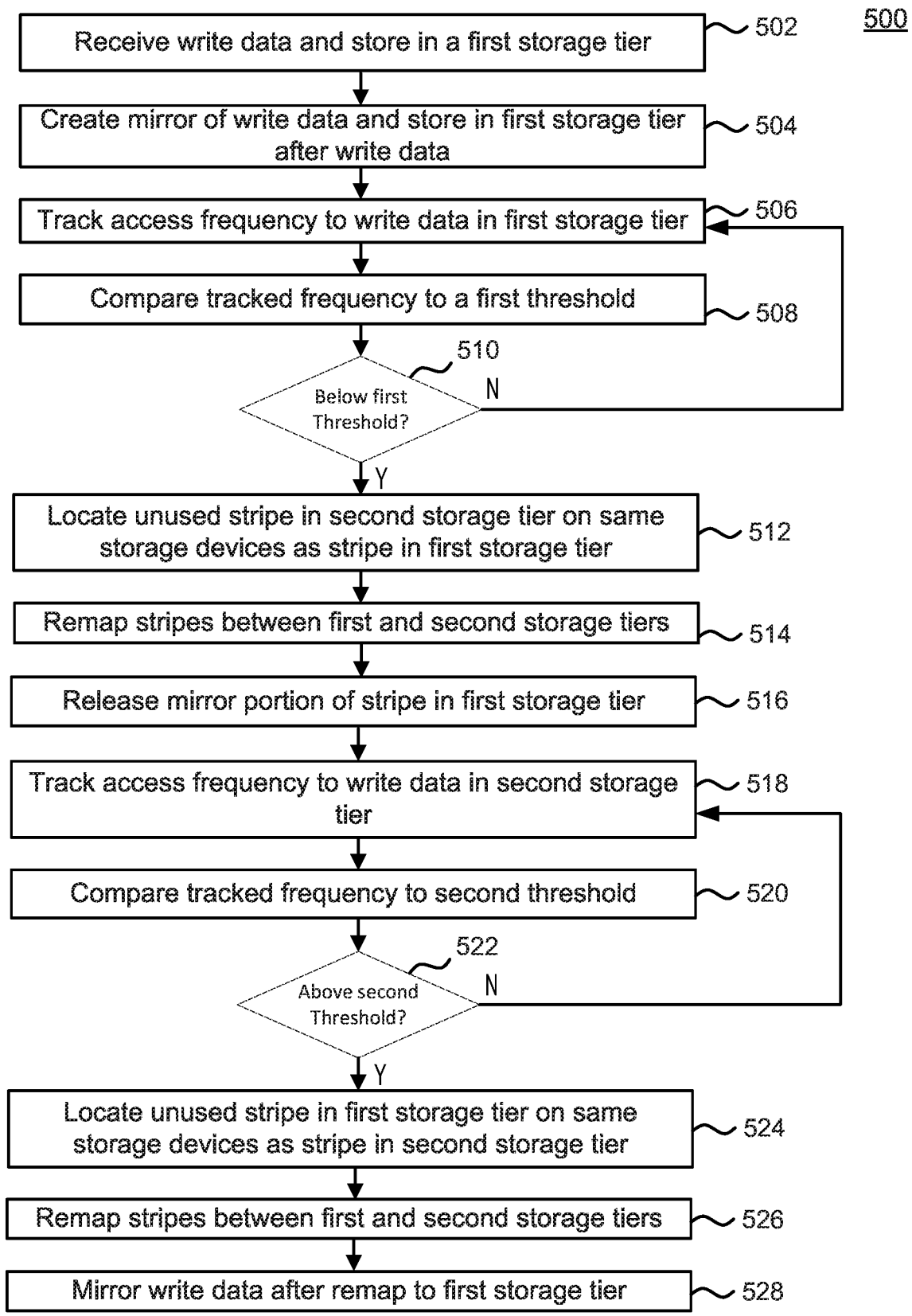
FIG. 5 is a flow diagram of a method for performing data migration through stripe swapping according to aspects of the present disclosure.

FIG. 5 is a flow diagram of a method 500 for performing data migration through stripe swapping according to aspects of the present disclosure. In an embodiment, the method 500 may be implemented by one or more processors of one or more of the storage controllers 108 of the storage system 102, executing computer-readable instructions to perform the functions described herein. In the description of FIG. 5, reference is made to a storage controller 108 (108.a or 108.b) for simplicity of illustration, and it is understood that other storage controller(s) may be configured to perform the same functions when performing a read or write operation. It is understood that additional steps can be provided before, during, and after the steps of method 500, and that some of the steps described can be replaced or eliminated for other embodiments of the method 500.

At block 502, the storage controller 108 receives write data from a host 104. The storage controller 108 stores the write data to a first storage tier, such as first storage tier 202 discussed above with respect to FIGS. 2, 3, 4A, 4B, 4C, and 4D. For example, the write data may be written to physical storage locations mapped to data extents B1, B2, B3, and B4 in the example of FIGS. 4A, 4B, 4C, and 4D. Further, the storage controller 108 may update entries in a mapping table maintained in correspondence with the first storage tier, for example a mapping table 300.

At block 504, the storage controller 108 creates a mirror of the received write data and stores it in the first storage tier following the storage of the write data.

At block 506, the storage controller 108 tracks an access frequency to the write data as the write data is stored in the first storage tier. For example, the storage controller 108 may track a number of read and/or modify requests for the write data over a predetermined period of time. For instance, the storage controller 108 may store and maintain metadata that indicates a number of read and/or modify requests to memory. The storage controller 108 may then analyze that metadata to determine a number of read and/or modify requests.

At block 508, the storage controller 108 compares the tracked access frequency for the write data to a predetermined first threshold. For example, the storage controller 108 may store in a cache or other memory the predetermined first threshold and access the stored information for the comparison. The threshold may be set during volume configuration or at some other appropriate time.

At decision block 510, the storage controller 108 determines whether the comparison at block 508 resulted in the tracked access frequency being less than (or, in embodiments, less than or equal to) the predetermined first threshold. If not, then the method 500 may return to block 506 to continue monitoring as discussed above.

If it is instead determined at decision block 510 that the tracked access frequency is less than (or less than or equal to) the predetermined first threshold, then the method 500 proceeds to block 512.

At block 512, the storage controller 108 locates an unused data stripe in a second storage tier (for example, a storage tier having a redundancy level different from the redundancy level of the first storage tier, such as a parity redundancy type like RAID 5 or RAID 6), where the data stripe has data extents associated with the same storage devices as the data stripe in the first storage tier that is storing the write data. Where the first storage tier has a mirror type of redundancy and the second storage tier has a parity type of redundancy, the storage controller 108 may also check to confirm that there is an additional data extent available in the data stripe in the second storage tier.

At block 514, the storage controller 108 remaps the data stripe containing the write data to the second storage tier instead of the first storage tier, as well as remaps the unused data stripe from the second storage tier to the first storage tier. The remapping occurs by the storage controller 108 changing the mapping in the mapping tables maintained for the respective first and second storage tiers, so that the data stripe containing the write data is now mapped with the second storage tier and the data stripe that was unused is now mapped with the first storage tier. Further, the storage controller 108 may read the data associated with each of the data extents being remapped to the second storage tier and compute parity information for it. Once the parity information is computed, the storage controller 108 stores the parity information in the data extent identified at block 512. As a result, the write data itself remains stored in the same physical locations on the storage devices and re-associated logically with the second storage tier. This reduces the number of writes to just the parity information.

At block 516, the storage controller 108 releases the mirrored data corresponding to the write data previously associated with the first storage tier. As a result of this release, the data stripe previously occupied by this data may be reclaimed and reused for future writes to the first storage tier.

At block 518, the storage controller 108 tracks an access frequency to the write data as the write data is now stored (logically) in the second storage tier. For example, the storage controller 108 may track a number of read and/or modify requests for the write data over a predetermined period of time. For instance, the storage controller 108 may store and maintain metadata that indicates a number of read and/or modify requests to memory. The storage controller 108 may then analyze that metadata to determine a number of read and/or modify requests.

At block 520, the storage controller 108 compares the tracked access frequency for the write data to a predetermined second threshold. For example, the storage controller 108 may store in a cache or other memory the predetermined second threshold and access the stored information for the comparison. In an embodiment, the predetermined second threshold may be a value greater than the predetermined first threshold so that an element of hysteresis is built into the system. Alternatively, the second threshold may be equal to the first threshold. The threshold may be set during volume configuration or at some other appropriate time.

At decision block 522, the storage controller 108 determines whether the comparison at block 520 resulted in the tracked access frequency being greater than (or, in embodiments, greater than or equal to) the predetermined second threshold. If not, then the method 500 may return to block 518 to continue monitoring as discussed above.

If it is instead determined at decision block 522 that the tracked access frequency is greater than (or greater than or equal to) the predetermined second threshold, then the method 500 proceeds to block 524. This corresponds to situations where the write data becomes more in demand, indicating that it may be worthwhile to migrate the write data back to the first storage tier for potentially improved access speed.

At block 524, the storage controller 108 locates an unused data stripe in the first storage tier, where the data stripe has data extents associated with the same storage devices as the data stripe in the second storage tier that is currently storing the write data. In an embodiment, this may also include checking to confirm that there are additional data extents, corresponding in number to the data extents where the write data is stored, available as well. For example, where the write data occupies 4 data extents, the storage controller 108 may check whether 8 data extents, 4 for the write data and 4 for the mirror of the write data, are unused.

At block 526, once an unused data stripe is located, the storage controller 108 remaps the data stripe containing the write data to the first storage tier instead of the second storage tier, as well as remaps the unused data stripe from the first storage tier to the second storage tier (basically, the reverse operation of the remapping discussed with respect to block 514 above). The remapping occurs in the mapping tables maintained for the respective first and second storage tiers.

Further, at block 528 the storage controller 108 reads the data associated with each of the data extents remapped to the first storage tier and a generates a mirrored copy for the first storage tier. The mirrored write data is stored in unused data extents in the first storage tier identified from block 524.

As a result of the elements discussed above, a storage system's performance is improved by reducing the number of operations necessary to migrate write data from a high performance storage tier to a capacity efficient storage tier. Further, the overall number of blocks written to storage devices is reduced, reducing wear on the storage devices themselves which may have limited endurance.

The present embodiments can take the form of a hardware embodiment, a software embodiment, or an embodiment containing both hardware and software elements. In that regard, in some embodiments, the computing system is programmable and is programmed to execute processes including the processes of method 500 discussed herein. Accordingly, it is understood that any operation of the computing system according to the aspects of the present disclosure may be implemented by the computing system using corresponding instructions stored on or in a non-transitory computer readable medium accessible by the processing system. For the purposes of this description, a tangible computer-usable or computer-readable medium can be any apparatus that can store the program for use by or in connection with the instruction execution system, apparatus, or device. The medium may include for example non-volatile memory including magnetic storage, solid-state storage, optical storage, cache memory, and Random Access Memory (RAM).

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
providing a first mapping table corresponding to a first storage volume having a first redundancy level and a second mapping table different than the first mapping table and corresponding to a second storage volume having a second redundancy level different than the first redundancy level;
storing, by a storage controller, write data to first and second physical locations of first and second storage devices, including placing entries in first and second sections of the first mapping table that point to the first and second physical locations;
skipping, by the storage controller, unused sections of data extents of the second storage volume corresponding to physical locations of the first and second storage devices to resolve a mismatch between stripes arising from addition of parity data of the second redundancy level, until locating unused third and fourth sections in the second mapping table associated by the second mapping table with third and fourth physical locations of the first and second storage devices, the third and fourth sections corresponding to a stripe where the third and fourth physical locations are on the same first and second storage devices as the first and second physical locations; and remapping, by the storage controller, the entries in the first and second sections of the first mapping table to the third and fourth sections of the second mapping table, resulting in the first and second physical locations being associated with the third and fourth sections in the second mapping table.

2. The method of claim 1, further comprising:
remapping, by the storage controller, the third and fourth sections of the second mapping table to the first and second sections at the time that the first and second sections are remapped to the third and fourth sections, resulting in the third and fourth physical locations being associated with the first and second sections.

3. The method of claim 1, wherein the first redundancy level comprises a mirroring redundancy and the second redundancy level comprises a parity redundancy, the method further comprising:
storing, by the storage controller, generated parity information for the write data remapped to the third and fourth sections to a physical location of a third storage device that is associated with a parity section in the second storage volume, the parity section being part of a data stripe comprising the remapped first and second sections.

4. The method of claim 1, further comprising:
tracking, by the storage controller, a number of read and modify requests for the write data over a time interval.

5. The method of claim 4, further comprising:
determining, by the storage controller, to perform the remapping in response to the tracked number of read and modify requests being below a threshold.

6. The method of claim 1, further comprising:
tracking, by the storage controller after the remapping, a number of read and modify requests for the write data in the second storage volume over a time interval.

7. The method of claim 6, further comprising:
determining, by the storage controller, to locate unused fifth and sixth sections associated with fifth and sixth physical locations of the first and second storage devices associated in the second storage volume in response to the tracked number of read and modify requests being greater than a threshold.

8. A non-transitory machine readable medium having stored thereon instructions for performing a method comprising machine executable code which when executed by at least one machine, causes the machine to:
provide a first mapping table corresponding to a first storage volume having a first redundancy characteristic and a second mapping table different than the first mapping table and corresponding to a second storage volume having a second redundancy characteristic different than the first redundancy characteristic;
store write data to first and second locations of first and second storage devices, the first and second locations being associated by the first mapping table with respective first and second data extents;
identify unused third and fourth data extents associated by the second mapping table with respective third and fourth locations of the first and second storage devices, the third and fourth data extents being located after unused sections of data extents of the second storage volume to resolve a mismatch between stripes from adding parity data, the third and fourth data extents corresponding to a stripe where the third and fourth locations are on the same first and second storage devices as the first and second locations; and
remap the first and second data extents to the third and fourth data extents, and the third and fourth data extents to the first and second data extents to associate the first and second locations with the third and fourth data extents in the second storage volume, and the third and fourth locations with the first and second data extents in the first storage volume.

9. The non-transitory machine readable medium of claim 8, further comprising machine executable code that causes the machine to:
identify the unused third and fourth data extents in response to access requests over a period of time falling below a threshold.

10. The non-transitory machine readable medium of claim 8, wherein the first redundancy characteristic comprises a mirroring redundancy and the second redundancy characteristic comprises a parity redundancy.

11. The non-transitory machine readable medium of claim 10, further comprising machine executable code that causes the machine to:
generate parity information for the write data remapped to the third and fourth data extents.

12. The non-transitory machine readable medium of claim 11, further comprising machine executable code that causes the machine to:
store the generated parity information to a location of a third storage device that is associated with a parity data extent in the second storage volume, the parity data extent being part of a data stripe comprising the remapped first and second data extents.

13. The non-transitory machine readable medium of claim 8, further comprising machine executable code that causes the machine to:
release, after the remap, fifth and sixth data extents associated with fifth and sixth physical locations of third and fourth storage devices storing a mirror of the write data so that the fifth and sixth data extents are available for new write data together with the third and fourth data extents.

14. The non-transitory machine readable medium of claim 8, wherein:
the remap comprises a remap of a first data stripe associated with the first and second data extents to the second storage volume and a second data stripe associated with the third and fourth data extents to the first storage volume.

15. A computing device comprising:
a memory containing machine readable medium comprising machine executable code having stored thereon instructions for performing a method of volume swapping;
a processor coupled to the memory, the processor configured to execute the machine executable code to cause the processor to:
provide a first mapping table corresponding to a first volume having a first redundancy level and a second mapping table different than the first mapping table and corresponding to a second volume having a second redundancy level different than the first redundancy level;
track access requests to write data stored to first and second physical locations of first and second storage devices, the first and second physical locations being associated by the first mapping table with respective first and second data extents in the first volume, locate, in response to the tracked access requests being below a threshold, unused third and fourth physical locations of the first and second storage devices by skipping unused data extents in the second volume to resolve a mismatch between stripes arising from addition of parity data of the second redundancy level, the third and fourth physical locations being associated by the second mapping table with third and fourth data extents in the second volume corresponding to a stripe where the third and fourth physical locations are on the same first and second storage devices as the first and second physical locations; and remap the first and second data extents to the third and fourth data extents, and the third and fourth data extents to the first and second data extents to associate the first and second physical locations with the third and fourth data extents in the second volume, and the third and fourth physical locations with the first and second data extents in the first volume.

16. The computing device of claim 15, wherein the threshold comprises a specified number of read and modify requests over a specified period of time.

17. The computing device of claim 15, wherein the threshold comprises a first threshold and the processor is further configured to:
track, after the remap, an amount of access requests as the first and second physical locations are associated with the third and fourth data extents in the second volume, the first threshold being less than a second threshold.

18. The computing device of claim 17, wherein the processor is further configured to:
locate, in response to the amount being greater than the second threshold, unused fifth and sixth data extents associated with fifth and sixth physical locations of the first and second storage devices in the first storage volume.

19. The computing device of claim 18, wherein the processor is further configured to:
remap the third and fourth data extents to the fifth and sixth data extents, and the fifth and sixth data extents to the third and fourth data extents, resulting in the first and second physical locations being associated with the fifth and sixth data extents and the fifth and sixth physical locations being associated with the third and fourth data extents.

* * * * *